1,934,409

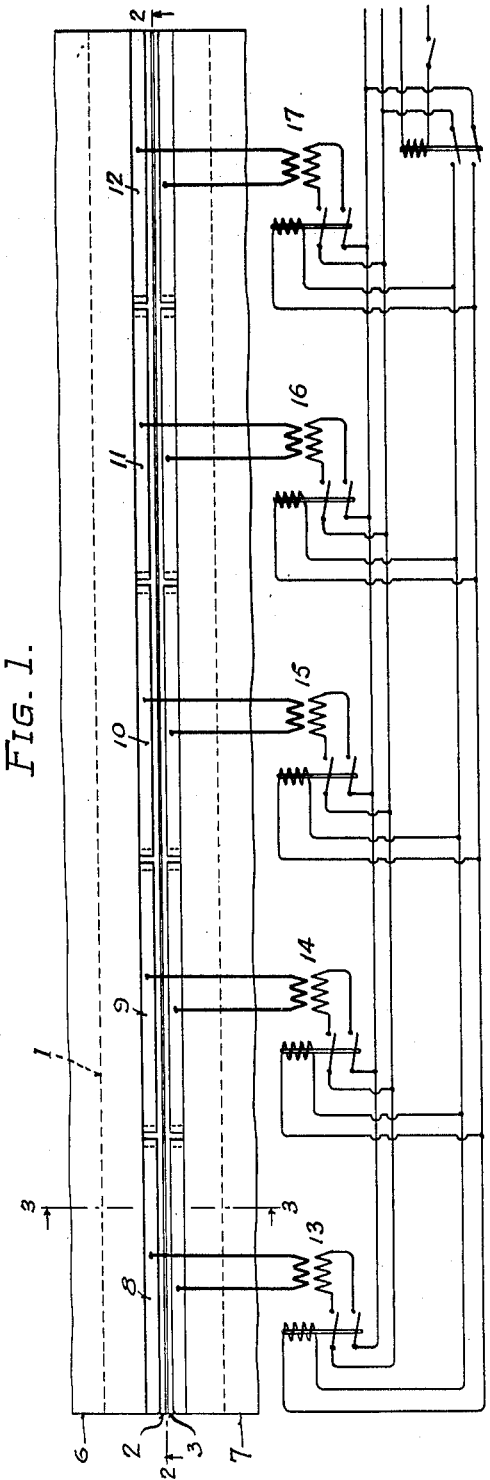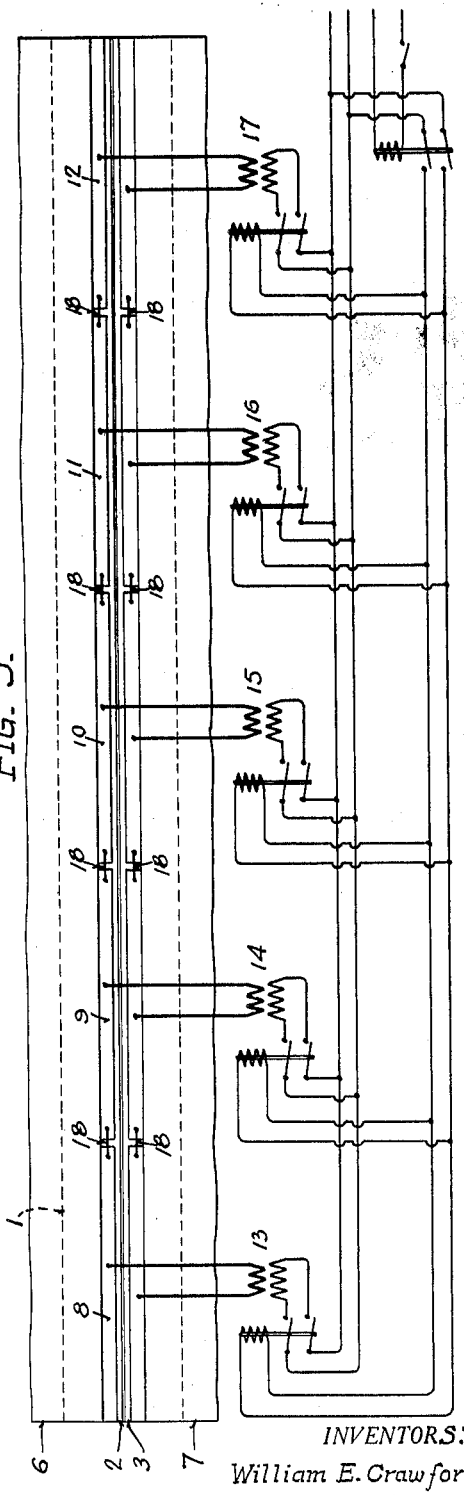

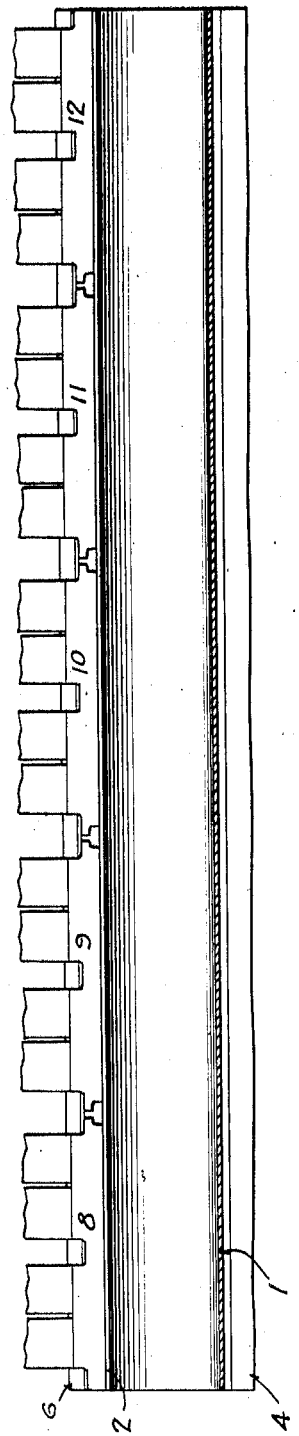
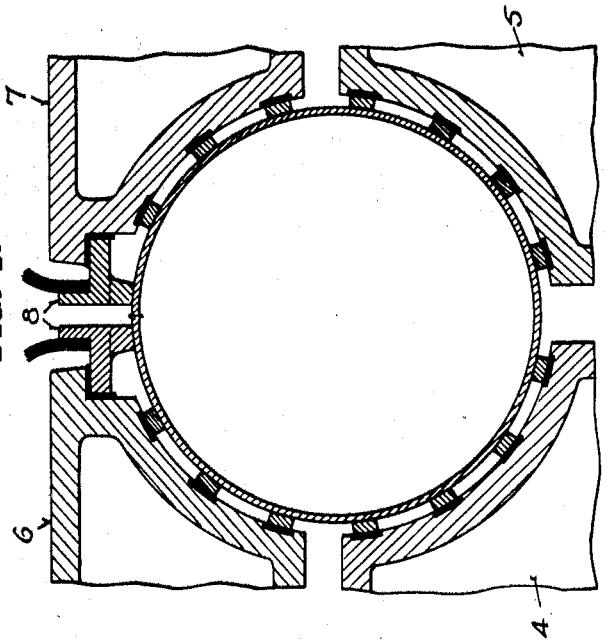
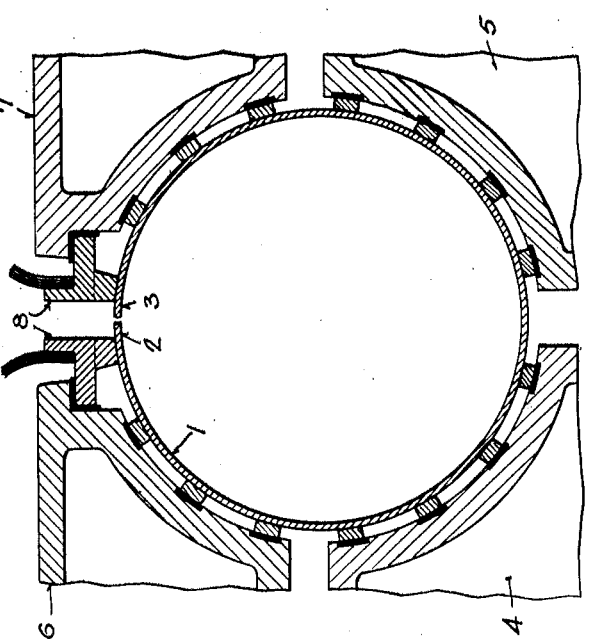
INVENTORS:
William E. Crawford
and Warren F. Heineman Patented Nov. 7, 1933

UNITED STATES PATENT OFFICE 1,934,409

METHOD AND APPARATUS FOR ELECTRICALLY WELDING PIPE

William E. Crawford, Wauwatosa, and Warren F. Heineman, Shorewood, Wis., assignors to A. O. Smith Corporation, Milwaukee, Wis., a corporation of New York Application October 21, 1929. Serial No. 401,176

9 Claims. (Cl. 219—4)

This invention relates to a method and apparatus for electrically welding longitudinal seams of tubular articles of substantial length and particularly to the flash welding of such articles.

The object of the invention is to prevent injury to the article by burning of the metal at or adjacent to the region of current application thereto.

Another object of the invention is to provide and maintain more uniform current distribution to the several longitudinal regions of the article.

A further object is to provide an apparatus which will carry out the above purposes through repeated welding operations without change.

In accordance with the present invention, in one of its phases, a plurality of welding units are provided and arranged end to end along the article to supply the different longitudinal regions of the seam with substantially independent welding currents. The different pairs of welding electrodes of the respective welding units are arranged in alignment and mechanically connected to move simultaneously to contact with the work, and then to move simultaneously with the work to establish and maintain the flashing arc between the edges of the work.

Furthermore, the several welding units have the contact surfaces of their respective pairs of electrodes spaced sufficiently to impede the longitudinal flow of current through the article between the electrodes of different units. In a modification of the invention, auxiliary current paths are provided between the several welding units to shunt the current tending to flow longitudinally through the article between the respective pairs of electrodes of the welding units.

Where the article is of such dimensions and rigidity as to prevent practical employment of sufficient clamping pressure per unit area of contact to prevent rocking of the electrodes on the article during the welding operation, the invention, in another phase, resides in employing a substantially narrow contacting face for the electrode, determined by the dimensions of the article. The width of the electrodes is sufficiently narrow to prevent injurious burning of the metal of the article by reason of the rocking or changing electrode contact therewith and to give the desired unit pressure of the contact.

The invention, in its several phases, may be more readily understood by reference to the accompanying drawings illustrating an apparatus made in accordance therewith.

The views of the drawings are as follows:

Figure 1 is a top plan view of the apparatus showing the electrodes and clamping members, with the electrical connections indicated diagrammatically.

Fig. 2 is a longitudinal section on line 2—2 of Figure 1.

Fig. 3 is a section on line 3—3 of Figure 1, showing the apparatus and article in position for welding.

Fig. 4 is a similar section showing the article in final upset welded condition.

Fig. 5 is a view similar to Figure 1, showing a modified form of the invention.

The tubular blank 1, to be welded, is preferably formed from a flat sheet of metal which is rolled or pressed on longitudinal lines until the side edges 2 and 3 thereof are presented in opposing welding relation. The blank is then placed in the welding machine with the edges 2 and 3 uppermost.

The welding machine, which is shown only in part to more clearly illustrate the present invention, the other parts constituting the subject matter of separate applications by the present inventors and others, comprises in general two lower or supporting clamping members 4 and 5, and two upper clamping members 6 and 7. These clamping members extend for the full length of the article and cooperate to clamp the article and to flex the same during the welding operation to maintain the flashing arc and finally upset the soft heated metal of the edges to effect the weld. They are operated preferably by hydraulic means, not shown, and are supported in a manner to maintain the same in accurate parallelism.

The upper pair of clamping members 6 and 7 have the several pairs of electrodes 8, 9, 10, 11 and 12 attached thereto and electrically insulated therefrom. Each pair of electrodes is arranged to contact with the metal of the article adjacent the opposite edges 2 and 3 for a predetermined fraction of the length of the seam. Furthermore, each pair of electrodes is supplied with welding current from an individual transformer, their respective transformers being 13, 14, 15, 16 and 17. These transformers are preferably connected in parallel to a common source of electrical energy and have commonly actuated controls, as is more clearly set forth in the application of William E. Crawford, Serial No. 335,700 filed January 28, 1929, since matured into Patent No. 1,857,499, dated May 10, 1932.

The several pairs of electrodes are spaced a predetermined minimum amount as illustrated in Figure 1, depending upon the potential of the welding current and the resistance of the article to the flow of current. It has been found that for ordinary steel pipe of about 1/4" thickness and with electrodes of the width hereinafter set forth, it is preferable to space the pairs of electrodes longitudinally from each other approximately 1" or more. The electrodes may be so constructed that the contacting faces are spaced this distance, the upper part of the electrodes being closer together to prevent undue splatter of the flash during the welding operation, as shown in Fig. 2.

The electrodes have contact faces curved to conform to the curvature of the article and of a width determined by the flexibility and dimensions of the article. It has been found that in the welding of steel pipe of about 12" in diameter and 3/8" to 1/2" wall thickness, it is preferable to employ electrode contact surfaces of about 3/4" to 1" in width. For larger diameter pipes with the same or greater flexibility, the electrodes may be wider.

During the operation of the apparatus, the clamping members 4 and 5 are first raised to bring the pipe loosely into contact with the electrodes. The clamping members 6 and 7 are then moved laterally toward each other to close the gap between the edges 2 and 3 of the pipe and thereby align the edges, after which the clamping members 4 and 5 are raised further to cause a pressure contact between the electrodes and the work and to clamp the work.

The clamping members 6 and 7 are then separated a predetermined distance to provide a gap between the edges 2 and 3 and the welding current is turned on at this time. The edges are then moved together slowly by means of the clamping members 6 and 7 and electrodes 8, 9, 10, 11 and 12 until a flashing arc is established between the edges. The flashing arc is maintained until it is uniformly distributed throughout the entire length of the seam and until the edges 2 and 3 are heated to welding temperature.

During this flashing operation, the clamping members 6 and 7 are moved toward each other with varying speed to maintain the flashing arc. When the edges have reached the welding temperature, the clamping members 6 and 7 are forced rapidly together under high pressure to upset the edges 2 and 3 and weld the same together, as illustrated in Fig. 4.

When, during the flashing operation, the edges in any particular region come into premature contact, there is a tendency for the current from adjacent regions to flow longitudinally through the pipe to the contacting region. This longitudinal flow of the welding current tends to burn the metal of the article between the electrodes of the several welding units due to the concentration of the current in the article at these points as current tends to flow longitudinally from electrode to electrode. By spacing the electrodes longitudinally, as provided by the present invention, the resistance of the metal of the article between the ends of the electrodes substantially prevents excessive longitudinal flow of current which tends to burn the metal of the article.

In the modified form shown in Fig. 5, excessive and injurious longitudinal flow of current through the article is prevented by the employment of flexible bonding members 18 between the respective electrodes of the several pairs which provide a shunt path for the current.

In either of the forms of the present invention, the electrodes are so arranged and supported as to have free expansion under temperatures produced by the welding operation and to prevent warping of the clamping members 6 and 7 and disalignment of the electrodes.

The extreme length of the pipe sections to be welded and the rigidity of the metal thereof in certain cases make it impractical to provide sufficient clamping pressure by means of an inside mandrel to prevent movement of the electrode on the surface of the article. This movement is known as rocking and is primarily caused by a substantial reduction in diameter of the article during the welding operation and its consequent constantly changing curvature as contrasted with the fixed curvature of the face of the electrode.

This rocking of the electrode on the article is evidenced by a concentration of the electrode pressure first on one corner of the electrode and then, as the edges of the article are moved toward each other during the welding operation, the pressure is concentrated on the other corner of the electrode. During the transition of the electrode pressure as above set forth, there is a period in which the pressure is substantially distributed over the entire area of the face of the electrode which reduces the pressure per unit of area of contact to a value which precludes a sufficient electrical contact between the electrodes and the article, thus causing burning of the article. The wider the electrode, the greater the danger of injury to the article. Furthermore, this difficulty is enhanced by reason of longitudinal irregularities in an article of such extreme length, which irregularities tend to magnify the injurious effects of any defective contact between the electrodes and the article.

By providing a narrow electrode, as above set forth, the total area of contact is sufficiently small to maintain the required minimum pressure per unit of contact at all times. The exact width of the electrode in any given case may be readily determined in accordance with the rigidity and dimensions of the article, the other factors being first determined and set.

The narrow electrode further maintains a more uniform length of current path through the article and across the seam during the welding operation.

The invention may have various modifications within the scope of the accompanying claims.

We claim:

1. In flash welding seams of substantial length the steps comprising supplying the various longitudinal regions of the seam with independent welding currents applied through substantially narrow electrode contact areas arranged on opposite sides of the seam and directing the current thereacross, and spacing the application of said currents to said regions to substantially prevent injurious flow of current through the article from one longitudinal region of the seam to another.

2. The method of flash welding seams of substantial length which comprises supplying the various longitudinal regions of said seam with independent welding currents applied through substantially narrow electrode contact areas arranged longitudinally on opposite sides of the seam and directing the current thereacross, spacing the application of said currents to said regions to substantially prevent injurious flow of currents through the article from one longitudinal region of the seam to another, and effecting the welding operations in the several longitudinal regions of the seam while simultaneously applying the several independent welding currents to weld the entire length of the seam simultaneously.

3. The method of flash welding seams of substantial length which comprises providing separate and independent welding units spaced longitudinally along the seam to supply the various longitudinal regions of said seam with independent welding currents through substantially narrow electrode contact areas arranged longitudinally on opposite sides of the seam and directing current thereacross, applying the independent currents of the several welding units simultaneously to effect a simultaneous welding of the entire length of the seam, and preventing injurious longitudinal flow of currents through the article between the respective pairs of electrodes during the welding operation.

4. An apparatus for flash welding tubular articles comprising a plurality of separate welding units each including a single pair of opposing electrodes arranged to contact with the article on opposite sides of the seam to be welded and a transformer to supply said electrodes with welding current, the respective pairs of electrodes of the several welding units being spaced longitudinally along the seam an amount sufficient to minimize injurious end-flow of the welding currents, and being proportioned in width in accordance with the curvature and flexibility of the article to substantially prevent injurious burning of the metal of the article at and adjacent the electrode contact therewith during the welding operation.

5. An apparatus for flash welding tubular articles comprising a plurality of separate welding units each including a single pair of opposing electrodes arranged to contact with the article on opposite sides of the seam to be welded and a transformer to supply said electrodes with welding current, the respective pairs of electrodes of the several welding units being spaced longitudinally along the seam a predetermined amount to minimize injurious end-flow of the welding currents and prevent injurious burning of the metal of the article during the welding operation, and means for simultaneously controlling the current of the several welding units to simultaneously weld the seam throughout its length.

6. An apparatus for flash welding longitudinal seams of tubular articles comprising a plurality of separate welding units each including a separate pair of opposing electrodes arranged to contact with the article on opposite sides of the seam to be welded and a transformer to supply said electrodes with welding current, means mechanically connecting the electrodes on each side of the seam in longitudinal spaced relation, and means effecting a simultaneous application of welding current through the respective welding units.

7. An apparatus for flash welding longitudinal seams of tubular articles comprising a plurality of separate welding units each including a pair of opposing electrodes arranged to contact with the article on opposite sides of the seam to be welded and a transformer to supply said electrodes with welding current, said electrodes contacting with the article in relatively long narrow areas parallel to and adjacent the seam, the respective contact areas on either side of the seam being in substantial alignment and equi-distant from the seam throughout the length of the article and being spaced longitudinally an amount substantially increasing the resistance to longitudinal current flow between the ends of adjacent electrodes through the article and sufficient to allow for thermal longitudinal expansion of the electrodes.

8. In an apparatus for flash welding a single longitudinal seam in a tubular article, a pair of electrodes so shaped as to apply welding current to the article at relatively narrow areas of electrode contact and disposed to extend longitudinally of the article on opposite sides of the seam being welded and adjacent thereto.

9. An apparatus for flash welding longitudinal seams of tubular articles comprising a plurality of separate welding units each including a pair of opposing electrodes arranged to contact with the article on opposite sides of the seam to be welded and a transformer to supply said electrodes with welding current, said electrodes contacting with the article in relatively long narrow areas parallel to and adjacent the seam, the respective contact areas on either side of the seam being in substantial alignment and equi-distant from the seam throughout the length of the article and being spaced longitudinally an amount allowing for thermal longitudinal expansion of the electrodes, and means electrically connecting the electrodes on either side of the seam end to end to prevent injurious longitudinal current flow through the article being welded.

WILLIAM E. CRAWFORD.
WARREN F. HEINEMAN.